(12) United States Patent
Maccari

(10) Patent No.: US 10,054,482 B2
(45) Date of Patent: Aug. 21, 2018

(54) TOOL FOR POSITIONING A SCANNING DEVICE

(71) Applicant: Antonio Maccari, Pisa (IT)

(72) Inventor: Antonio Maccari, Pisa (IT)

( * ) Notice: Subject to any disclaimer, the term of this patent is extended or adjusted under 35 U.S.C. 154(b) by 0 days.

(21) Appl. No.: 14/858,745

(22) Filed: Sep. 18, 2015

(65) Prior Publication Data

US 2016/0084706 A1   Mar. 24, 2016

(30) Foreign Application Priority Data

Sep. 22, 2014   (IT) .............................. MO2014A0272

(51) Int. Cl.
| | |
|---|---|
| *G01B 11/14* | (2006.01) |
| *G01J 3/02* | (2006.01) |
| *G01J 3/06* | (2006.01) |
| *G01J 3/50* | (2006.01) |

(52) U.S. Cl.
CPC ........... *G01J 3/0202* (2013.01); *G01J 3/0289* (2013.01); *G01J 3/0291* (2013.01); *G01J 3/06* (2013.01); *G01J 3/50* (2013.01)

(58) Field of Classification Search
CPC ......... G01N 21/00; G03B 21/00; G02B 15/00
USPC ........... 356/610–614, 237.2–237.6, 369, 364
See application file for complete search history.

(56) References Cited

U.S. PATENT DOCUMENTS

| | | | |
|---|---|---|---|
| 5,073,028 A | 12/1991 | Bowden et al. | |
| 5,789,890 A * | 8/1998 | Genov | B25J 9/1615 318/567 |
| 6,012,966 A * | 1/2000 | Ban | B24B 37/04 451/287 |
| 6,270,306 B1 * | 8/2001 | Otwell | H01L 21/67167 414/217 |
| 6,813,032 B1 * | 11/2004 | Hunter | G01N 21/8903 250/559.22 |
| 7,044,703 B2 * | 5/2006 | Fukuda | H01L 21/67294 414/416.03 |
| 7,419,346 B2 * | 9/2008 | Danna | H01L 21/67736 414/217 |

(Continued)

FOREIGN PATENT DOCUMENTS

| | | |
|---|---|---|
| EP | 0453830 A2 | 10/1991 |
| WO | 2007135544 A2 | 11/2007 |
| WO | 2012101922 A1 | 8/2012 |

OTHER PUBLICATIONS

X-RITE Photo, "X-RITE: EOAST: i1i0 1st Generation", May 19, 2015, 1 page, XP055189987.

*Primary Examiner* — Isiaka Akanbi
(74) *Attorney, Agent, or Firm* — Pearne & Gordon LLP

(57) ABSTRACT

A tool for positioning a scanning device provided with a spectrometer comprises a support having a resting zone suitable for being rested onto a surface, a fixing arrangement for fixing the scanning device to the tool. The support is so dimensioned as to leave uncovered an operative zone in which the spectrometer is movable for acquiring an image provided on a substrate, so that the spectrometer can acquire the image while the support is resting directly on the substrate. The tool further comprises a vision device comprising a video camera for recording the image and a control unit that controls the video camera, the control unit being programmed to recognise pre-established points of the image recorded by the video camera.

13 Claims, 4 Drawing Sheets

(56) References Cited

U.S. PATENT DOCUMENTS

| | | | |
|---|---|---|---|
| 8,768,513 B2 * | 7/2014 | Cox | H01L 21/67742 |
| | | | 700/1 |
| 8,788,087 B2 * | 7/2014 | Hashimoto | B25J 9/1692 |
| | | | 700/218 |
| 9,944,822 B2 * | 4/2018 | Jing | C09D 7/67 |
| 2003/0159528 A1 * | 8/2003 | Kim | G01N 21/9501 |
| | | | 73/865.8 |
| 2005/0243318 A1 | 11/2005 | Baker et al. | |
| 2006/0121602 A1 | 6/2006 | Hoshizaki et al. | |
| 2008/0316482 A1 | 12/2008 | Hoshizaki et al. | |
| 2009/0218310 A1 * | 9/2009 | Zu | B82Y 10/00 |
| | | | 216/11 |
| 2009/0249863 A1 * | 10/2009 | Kim | H01L 21/67126 |
| | | | 73/31.07 |

* cited by examiner

TOOL FOR POSITIONING A SCANNING DEVICE

This invention relates to a tool for positioning a scanning device, particularly applicable in the field of decoration of sheet-like elements such as ceramic tiles, but also wooden panels, stone or marble slabs and the like.

Many scanning devices are available on the market which allow images to be acquired, said images being intended to be subsequently processed for a wide variety of purposes, for example for obtaining images to be printed. The known scanning devices particularly allow to acquire calibration targets, in order to carry out comparison and measurement of colours, thereby testing the capability of reproducing colours of a graphics system, or calibrating and/or profiling a graphics device.

Among the scanning devices of the known type, it is worth mentioning the scanning table X-Ritei1iO™ for its excellent performance. This scanning table comprises a rectangular base for restingly receiving the substrate on which the image is printed, and an arm carrying a spectrometer intended to scan the image. The arm is rotatable with respect to the base, whilst the spectrometer is rotatable relative to the arm, so that, by varying the angle between the arm and the base and that between the spectrometer and the arm, the entire are of the image printed on the substrate can be scanned, which substrate is resting on the base.

Although it is theoretically possible to use the scanning table mentioned above to scan images printed on substrates of different materials, it is clear that such a table was specifically designed for acquiring images or calibration targets printed on paper sheets. Proof of this, is the base being provided with a function which allows to activate a force of electrostatic attraction to hold the paper sheet in a fixed position. Additionally the base is so dimensioned as to support a sheet whose maximum size corresponds to A4 size. Still further, the scanning table mentioned above is able to perform measurements on substrates with a maximum thickness of 10 mm.

These features of the known scanning table, make the scanning table actually unsuitable for scanning images printed on sheet-like elements of considerable size, such as ceramic tiles. Ceramic tiles have indeed dimensions which very often are greater than the A4 size. Furthermore, producing ceramic tiles having a thickness greater than 10 mm is not uncommon nowadays.

If it is desired to use the scanning table mentioned above for acquiring images printed on a ceramic tile having a size larger than the A4 size, it is currently necessary to cut the tile into portions smaller or equal to the A4 size, and subsequently to scan each tile portion individually. This way of proceeding is rather slow and complicated since a cutting operation and several scanning operations need to be performed. Further, since the tile needs to be cut in order to obtain tile portions each having an A4 size, it is difficult, if not impossible, to acquire and process the image details in the zones in which the tile was cut. Still further, the cutting operation typically generates dust which must be removed carefully from the tile prior to scanning, with further loss of time.

Irrespective of the above mentioned drawbacks, the tiles having a thickness greater than 10 mm, cannot be processed currently by means of the scanning table at issue.

It is therefore an object of the invention to improve use of scanning devices of the known type, particularly the spectrometer used with the scanning table X-Ritei1iO™.

A further object is to provide a tool enabling use of the known scanning devices also for acquiring images printed on sheet-like substrates of large size, particularly ceramic tiles or other sheet-like substrates with a size larger than the A4 size, without the starting substrate having to be cut preliminarily in smaller portions.

Another object is to provide a tool that makes it possible to use the scanning devices of the known type also for acquiring images printed on sheet-like substrates having a relatively high thickness, particularly ceramic tiles or other sheet-like substrates having a thickness greater than 10 mm.

According to the invention, there is provided a tool for positioning a scanning device provided with a spectrometer, the tool comprising:

a support having a resting zone which is suitable for resting on a surface,
  a fixing arrangement for fixing the scanning device to the tool, wherein the support is so dimensioned as to leave uncovered an operative zone in which the spectrometer can be moved for acquiring an image provided on a substrate, so that the spectrometer can acquire the image while the support is resting directly on the substrate.

If compared with the scanning tables of the prior art, the tool according to the invention allows to remove the base on which the substrate carrying the image to be acquired is resting. Instead of placing the substrate on a base of the scanning table, the tool according to the invention works when resting on the substrate which carries the image to be acquired. This is made possible by the conformation of the resting zone of the tool, said resting zone being so dimensioned as to leave the operative zone free. The resting zone of the tool thus does not interfere with the spectrometer when the latter is in an operational configuration. In other words, the support of the tool according to the invention, defines an open zone arranged in front of it, through which the spectrometer can perform scanning of the substrate located below the tool.

The tool according to the invention allows to overcome the size limitations of the substrates carrying the image to be acquired, as found in the scanning tables of the prior art. Images can be acquired of arbitrarily large objects, since in the tool according to the invention, it is the support that rests on the substrate and not vice versa. Thus, the scanning device can also be used to acquire images printed on large size ceramic tiles, for example ceramic slabs having a width of 1 meter and a length of 3 meters. The support of the tool according to the invention, can even be rested directly onto a floor, for example a precious ancient floor or a marble floor, particularly valuable from the aesthetic point of view, so that one or more images of the floor are acquired directly by the scanning device.

Further, the thickness of the substrate carrying the image is completely irrelevant as far as operation of the scanning device is concerned, since it is the tool that rests on the substrate, and not vice versa. It is therefore possible to acquire images provided on substrates of any thickness and also on non-removable substrates, i.e. substrates arranged in a fixed position, such as a floor which has already be laid.

In an embodiment, the tool comprises a pair of side appendages helping to define the resting zone. Owing to the side appendages, during use, the operative zone, in which the spectrometer is movable, is at least partially surrounded by the resting zone, in plan view.

The side appendages make the support more stable during use of the scanning device. In addition, the side appendages may be used as a reference for correctly positioning the tool with respect to a calibration target that is printed on the substrate and that it is desired to acquire. In an embodiment, the side appendages are fixed relative to the support. In another embodiment, the side appendages are movable relative to the support.

The side appendages may be particularly movable between an open position and a closed position.

In the open position, the side appendages define the spectrometer operative zone, together with the support.

In the closed position, the side appendages help to close the housing defined between the support and the protection structure, so as to protect the scanning device and reduce the risks that the scanning device can be damaged when inactive, for example during transport.

In an embodiment, the tool comprises a vision device provided with a video camera and a control unit that controls the video camera, the control unit being programmed to recognize pre-established points of an image recorded by the video camera.

This embodiment is particularly suitable for being used in cases in which the image to be acquired by the scanning device is a calibration target, since correct positioning of the scanning device with respect to the calibration target is hereby ensured.

The control unit and the video camera of the vision device can be integrated in a tablet.

The tablet is an easy to use and low-cost tool, which provides a vision device for recognizing pre-established points on the image to be acquired, particularly in the case in which the latter is a calibration target, so that it is ensured that the scanning device is positioned correctly.

The invention will be better understood and carried out with reference to the accompanying drawings which illustrate some embodiments thereof by way of a non-limiting example wherein.

Figure 1:
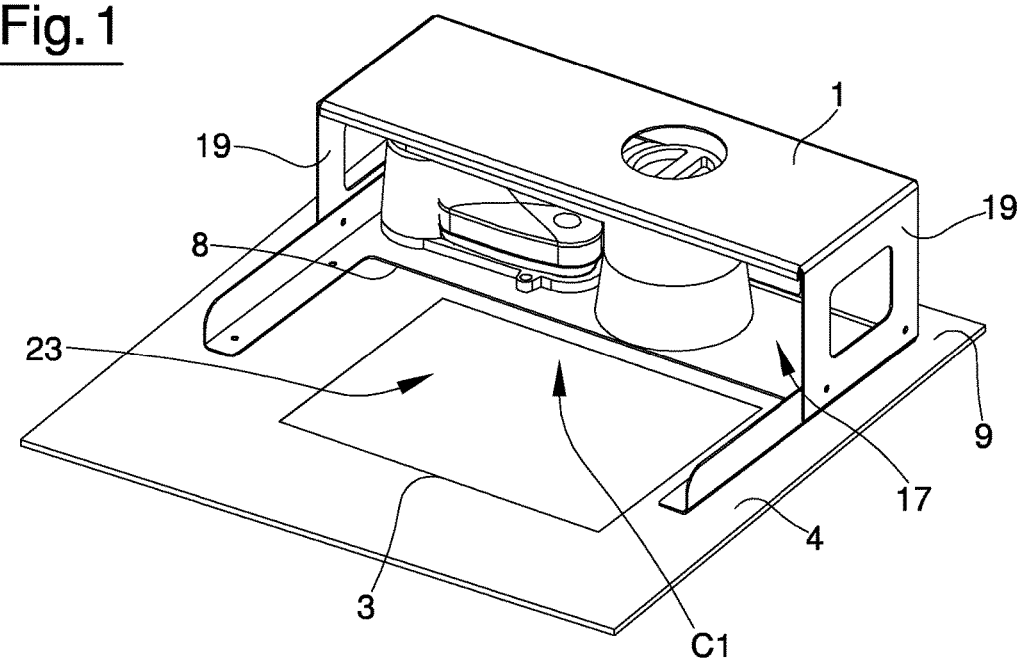
FIG. 1 is a perspective view showing a tool for positioning a scanning device and the corresponding scanning device, in a rest configuration.
Figure 2:
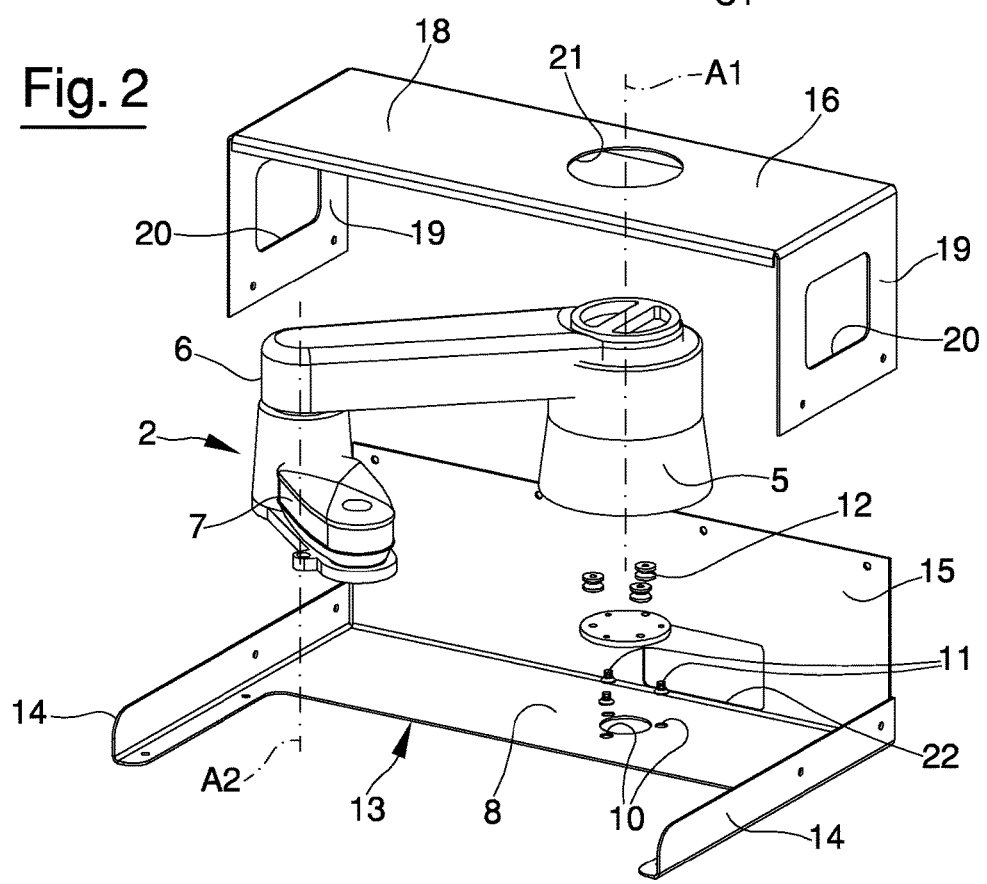
FIG. 2 is an exploded view of the tool of FIG. 1 and of the corresponding scanning device.
Figure 3:
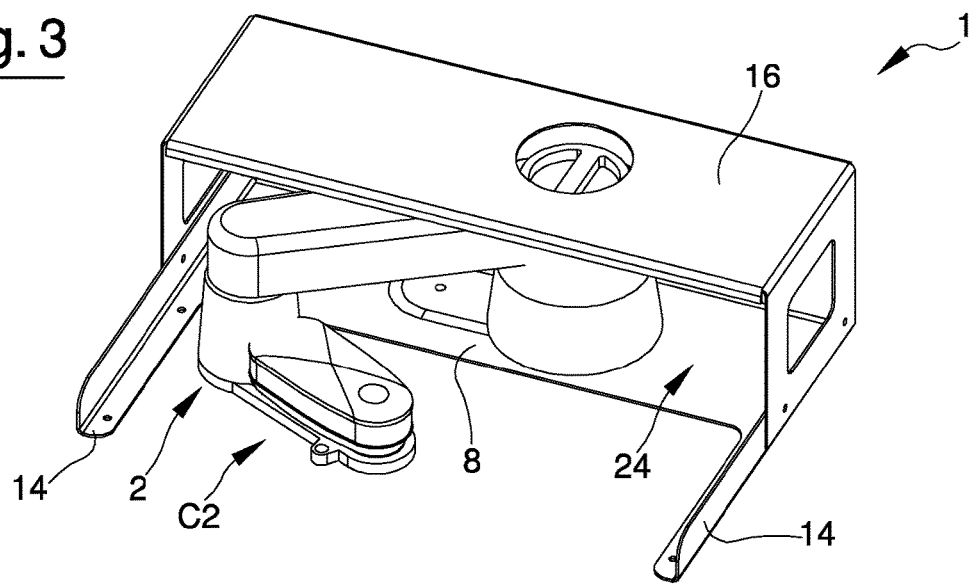
FIG. 3 is a schematic perspective view showing the tool of FIG. 1, with the corresponding scanning device positioned in an operational configuration.

FIGS. 1 to 3 show a tool 1 for positioning a scanning device 2 on a substrate 4, so that the scanning device 2 can acquire an image 3 provided on the substrate 4.

The substrate 4 may be a ceramic slab or tile, a wood or plywood panel, a sheet of polymeric material or the like.

More generally, the substrate 4 can also be any substrate delimited by a surface that one wishes to acquire, such as a floor or a decorated and backlit surface.

The image 3 may be a calibration target for profiling or calibrating a printing device. In particular, the calibration target may be the so-called "palette" which was mentioned in the international patent application WO 2007/135544, filed in the name of the same applicant as this application.

The scanning device 2 is a scanning device of known type, which is already available on the market. In particular, the scanning device 2 may be the one integrated in the scanning table known by the trade name X-Rite i1iO™, or a similar scanning device.

As illustrated in FIG. 2, the scanning device 2 comprises a foot 5 and an arm 6 that is rotatable about a first axis A1 relative to the foot 5. The scanning device 2 further comprises a spectrometer 7 rotatable about a second axis A2 relative to the arm 6. The first axis A1 and second axis A2 are parallel one to another and are arranged vertically in use.

The scanning device 2 further comprises a motor for moving the arm 6 and the spectrometer 7 under control of a suitable computer program.

The tool 1 comprises a support 8 having a resting zone suitable for resting on a surface, particularly an upper surface 9 of the substrate 4. The resting zone can be conformed as a substantially flat resting wall 13. When the tool 1 is in use, the resting wall 13 is arranged horizontally.

The support 8 is suitable for supporting the scanning device 2. To this end, the support 8 comprises a fixing arrangement for fixing the scanning device 2 to the support 8. The fixing arrangement can be obtained on the resting wall 13. The fixing arrangement may comprise a plurality of holes 10, in which respective screws 11 are engaged. The screws 11 can be fastened, possibly by means of pins 12, to the foot 5 of the scanning device 2. The scanning device 2 can thus be fixed to the support 8 by means of threaded connections.

The support 8 may further comprise two side appendages 14, which project from two opposite end zones of the resting wall 13. Also the side appendages 14 are suitable for being rested onto the upper surface 9 of the substrate 4, so as to make more stable the position of the support 8 and of the scanning device 2 fixed thereto. In particular, the side appendages 14 co-operate with the support 8 to prevent the scanning device 2 from overturning during use.

In the embodiment of FIGS. 1 to 3, the resting zone, wherein the tool 1 is resting on the surface 9, is therefore defined by a lower surface of the resting wall 13 and a lower surface of the side appendages 14.

The side appendages 14 may exhibit an "L"-shaped cross section.

The support 8 may comprise a rear wall 15 which protrudes vertically from the resting wall 13. The rear wall 15 particularly protrudes from an edge zone of the resting wall 13, opposite the zone from which the side appendages 14 project.

The rear wall 15 may be provided with a passage 22, allowing the support 8 to be lightened.

The tool 1 further comprises a protection structure 16 that is suitable for being fixed to the support 8, thereby defining a housing 17 with the support 8. The scanning device 2 can be received in the housing 17, in a rest configuration C1, as shown in FIG. 1.

In particular, the scanning device 2 is in the rest configuration C1 when no image is to be acquired by the spectrometer 7. In the rest configuration C1, the spectrometer 7 is rotated about the second axis A2, so that it becomes aligned with the arm 6 and arranged below the latter. The arm 6 is in turn rotated within the housing 17. In such a manner, the scanning device 2 can be suitably protected in the event of impacts, falls or other accidental damage.

As shown in FIG. 2, the protection structure 16 may be shaped like an inverted "U". In particular, the protection structure 16 may comprise an upper wall 18 having two peripheral zones, from which respective side walls 19 protrude.

Each side wall 19 may be provided with a lateral opening 20 for inspecting the scanning device 2.

The upper wall 18 may have an upper opening 21 for accessing to the scanning device 2.

The housing 17 is open at the front. In other words, an opening 24 is defined between the resting wall 13, the upper wall 18 and the side walls 19. Through the opening 24 the spectrometer 7 can exit the housing 17, thereby moving into an operational configuration C2, in which the spectrometer 7 is able to acquire an image 3. In order that the spectrometer 7 may be moved into the configuration C2, the arm 6 rotates relative to the foot 5, about the first axis A1 and/or the spectrometer 7 rotates about the second axis A2, relative to the arm 6. Of course, it is possible to define a plurality of operational configurations C2, only one of which is shown in FIG. 3, depending on which point of the image 3 the spectrometer shall acquire.

In the operational configurations C2, the spectrometer 7 is positioned in an operative zone 23, in which the spectrometer 7 is facing the substrate 4 so as to acquire the image 3. In the embodiment of FIGS. 1 to 3, the operative zone 23 is located in front of the resting wall 13.

The operative zone 23 is open at the bottom thereof. Indeed, the resting zone defined by the resting wall 13 and the side appendages 14, is so dimensioned as not to obstruct the operative zone 23. In other words, the above-mentioned resting zone has dimensions, in plan view, which are such that the substrate 4 in the operative zone 23 is left uncovered.

In this way, when the spectrometer 7 is in the operative zone 23, there are no obstacles between the spectrometer 7 and the image 3 to be acquired. Thus the spectrometer 7 can acquire the image 3 without interfering with the zone on which the support 8 rests.

This makes it possible to acquire the image 3 while the tool 1, and in particular the support 8 thereof, are resting directly on the substrate 4. It is therefore not necessary to provide a base of the tool 1 that is able to support the substrate 4, which allows to eliminate substantially all of the size limitations that the substrate 4 had to satisfy in the prior art in order to be acquired by the scanning device 2.

Besides making the tool 1 more stable, the side appendages 14 may serve to correctly position the tool 1 with respect to the image 3 to be acquired, which is particularly useful if the image 3 is a calibration target. In this case, the tool 1 can be so positioned that an edge of the calibration target is parallel to, or in contact with, an edge of a side appendage 14, and possibly a further edge of the calibration target is parallel to, or in contact with, an edge of the resting wall 13. It is thus assured that the calibration target is acquired by the scanning device 2 while the calibration target is in a certain and repeatable position, said position being reachable by the spectrometer 7.

Figure 4:
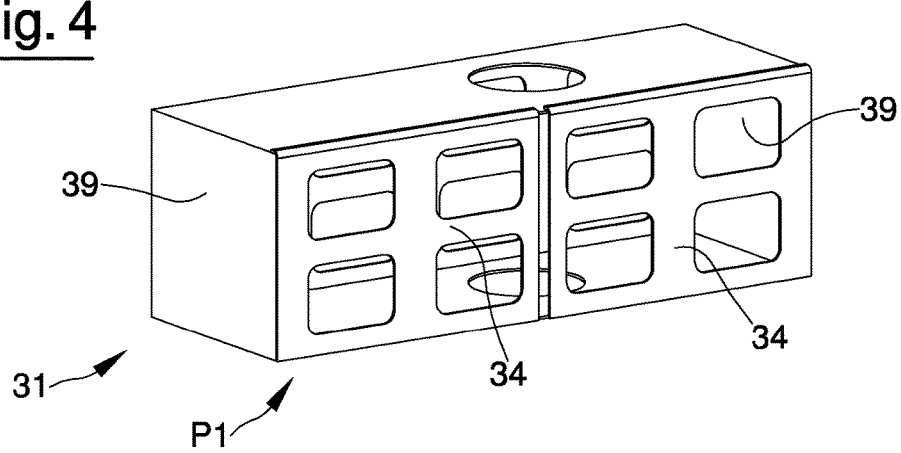
FIG. 4 is a perspective view of a tool for positioning a scanning device according to an alternative embodiment, in a closure position.
Figure 5:
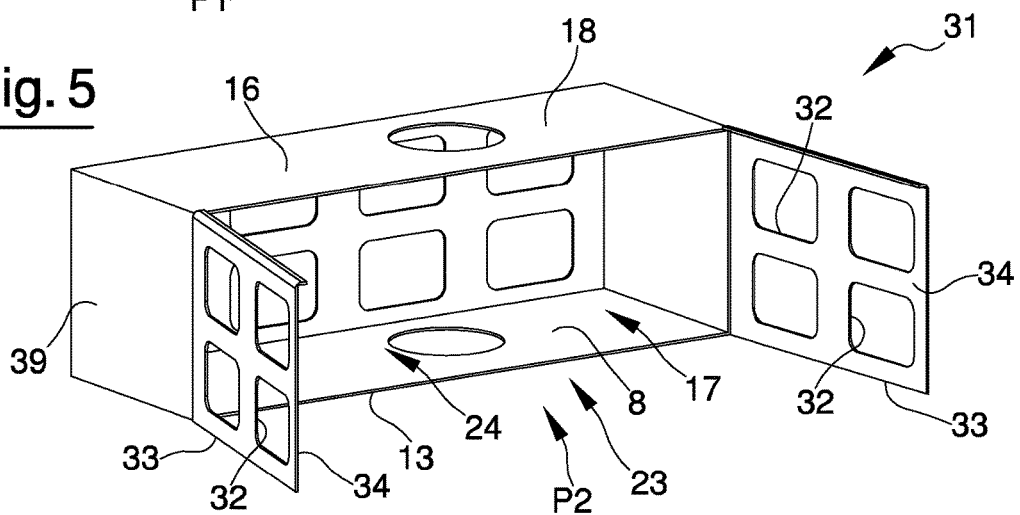
FIG. 5 is a view like that of FIG. 4, showing the tool in an open position.

FIGS. 4 and 5 show a tool 31 according to an alternative embodiment. For the sake of simplicity, the tool 31 only is illustrated in FIGS. 4 and 5, in which the scanning device is not visible.

The parts of the tool 31 which are comprised in the tool 1 shown in FIGS. 1 to 3, shall be referred to with the same reference numbers already used previously, and will not be described again in detail.

The tool 31 shown in FIGS. 4 and 5 differs from the tool 1 shown in FIGS. 1 to 3 mainly because it comprises two closing elements 34 which can be selectively opened or closed so as to make accessible or close the housing 17.

The closing elements 34 may be hinged to respective side walls 39 that laterally delimit the housing 17, the side walls 39 being for example obtained on the protection structure 16.

The closing elements 34 can be provided with through-openings 32 which serve to lighten the closing elements 34 and possibly to make visible the contents of the housing 17.

The closing elements 34 are movable between a closed position P1, shown in FIG. 4, and an open position P2, shown in FIG. 5. In the closed position P1, the closing elements 34 close the housing 17 frontally. When the scanning device 2 is not in use and is in the rest configuration C1, i.e. when the scanning device 2 is folded internally of the housing 17, the closing elements 34 are arranged in the closed position P1. In this position, the closing elements 34 have a protective function, as they help to protect the scanning device 2 from impacts and the like.

In the open position P2, the closing elements 34 are rotated with respect to the side walls 39 so as to be aligned, or nearly aligned, with the side walls 39. The housing 17 is thus opened and the spectrometer 7 can exit the housing 17 in order to be placed above the image 3 and acquire details thereof. In particular, the spectrometer 7 can exit the housing 17 through the opening 24, which can be defined in the open position P2. The closing elements 34 thus behave as doors that selectively close the housing 17 in a front region thereof.

The closing elements 34 can be designed in such a manner that a lower edge 33 thereof is resting on the substrate 4 in the open position P2. In this case, the closing elements 34 act as the side appendages 14 of the embodiment illustrated in FIGS. 1 to 3, and help to increase stability of the tool 1 and thus also of the scanning device 2 supported by the tool 1. Indeed, the lower edges 33, together with the resting wall 13 of the support 8, define the resting zone, where the tool 31 is resting on the substrate carrying the image to be scanned.

Apart from the possibility of opening or closing the closing elements 34, the tool 31 shown in FIGS. 4 and 5 operates quite similarly to the tool 1 shown in FIGS. 1 to 3. In particular, during scanning, the tool 31 can be placed directly onto a surface of the substrate carrying the image to be acquired. Also in this case, in fact, the operative zone 23, in which the spectrometer 7 is located while acquiring the image, is open at the bottom thereof, i.e. outside the overall plan dimensions of the resting zone in which the tool 31 is resting on the substrate carrying the image. Compared to the embodiment of FIGS. 1 to 3, the tool 31 shown in FIGS. 4 and 5 is more compact in the closed position P2. This makes it easier to handle and transfer the tool 31. In particular, the tool 31 can be so dimensioned that, in the closed position P2, the tool 31 can contained in a suitcase admitted as hand luggage on airplanes. This greatly facilitates transferring of the tool 31 also to production plants which are located far away.

Figure 6:
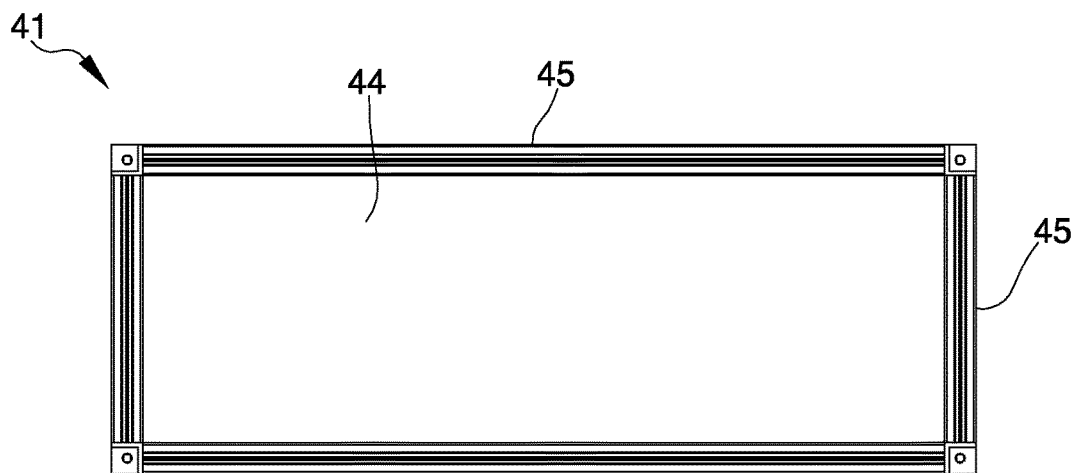
FIG. 6 is a top view of a tool for positioning a scanning device according to a further alternative embodiment, showing also the corresponding scanning device.
Figure 7:
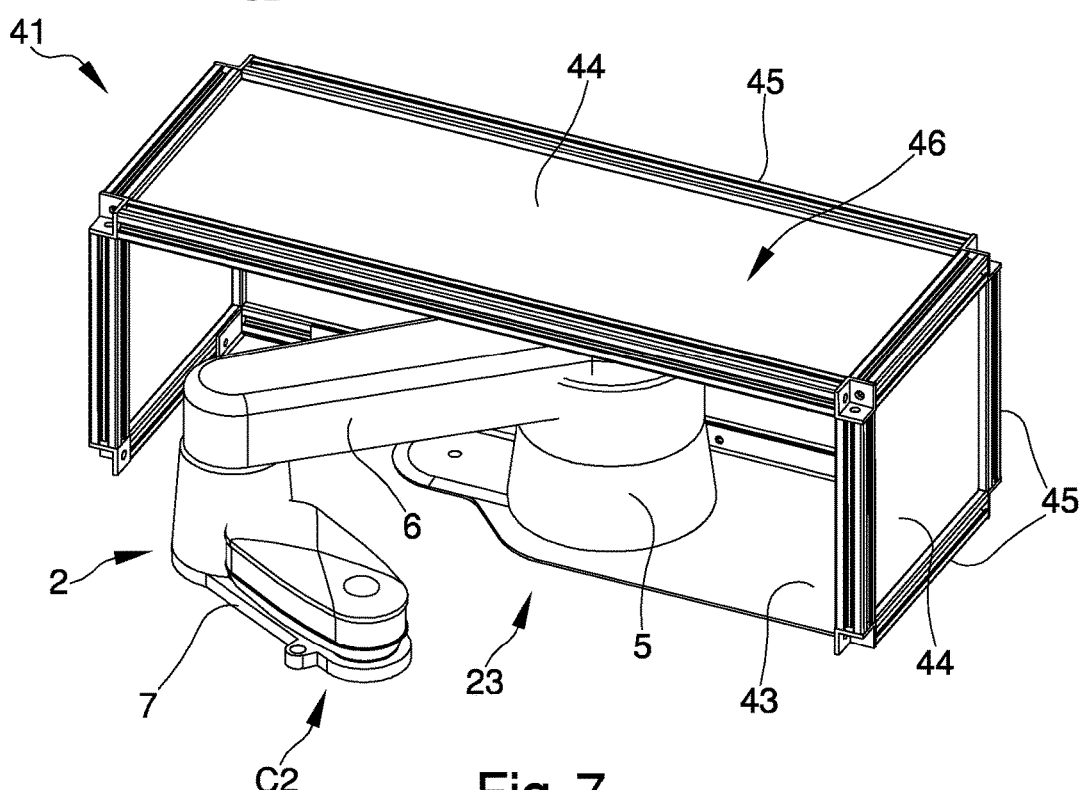
FIG. 7 is a perspective view of the tool of FIG. 6 and of the corresponding scanning device.

FIGS. 6 and 7 show a tool 41 for positioning the scanning device 2 according to a further alternative embodiment.

The parts of the tool 41 which are common to the tools shown in FIGS. 1 to 5 are indicated with the same reference numbers already used previously, and will not be described again in detail.

The tool 41 shown in FIGS. 6 and 7 differs from the tools described previously with reference to FIGS. 1 to 5, mainly because it lacks of the side appendages projecting from the resting wall for increasing stability of the tool 1.

In this embodiment, the resting zone of the tool 41 is defined only by a resting wall 43 of the support 8.

In the embodiments of FIGS. 1 to 5, the resting wall 13 exhibits a substantially rectangular shape, in plan view. A resting wall of this type can be also used in the embodiment lacking of the side appendages.

Alternatively, as shown in FIGS. 6 and 7, there may be provided a resting wall 43 so conformed as to have a substantially trapezoidal shape in plan view.

The embodiment shown in FIGS. 6 and 7 has the advantage of being compact and easy to build. Conversely, the stability of the tool is reduced compared to the embodiment of FIGS. 1 to 5, however the risk of overturning the tool can still be considered low, especially where the tool is used by careful operators.

In the embodiment of FIGS. 1 to 5, the support and protection structure were defined by panels, particularly metal panels, folded and/or welded together, so as to obtain the desired conformation of the walls.

Alternatively, as shown in FIGS. 6 and 7, a protection structure 46 can be provided having edges that are defined by bars 45, comprising respective ends joined together, in such a way as to define a casing reticular frame. The spaces between the bars 45 are closed by panels 44.

The operation of the tool 41 shown in FIGS. 6 and 7 does not differ substantially from that of the tools described previously. The tool 41 as well is placed directly onto the substrate carrying the image to be acquired, by positioning the resting zone of the tool 41 on an upper surface of the substrate. At this point the spectrometer 7 can be moved out of the housing 17, thereby passing from the rest configuration to an operational configuration C2, as shown in FIGS. 6 and 7. When in the operational configuration C2, the spectrometer 7 is located in an operative zone 23 arranged in front of the tool 41. The size and shape of the resting zone 43 are such that the resting zone 43 does not protrude into the operative zone 23, so as not to hinder image acquisition by the spectrometer 7 when the tool 41 is resting directly on the substrate.

Figure 8:
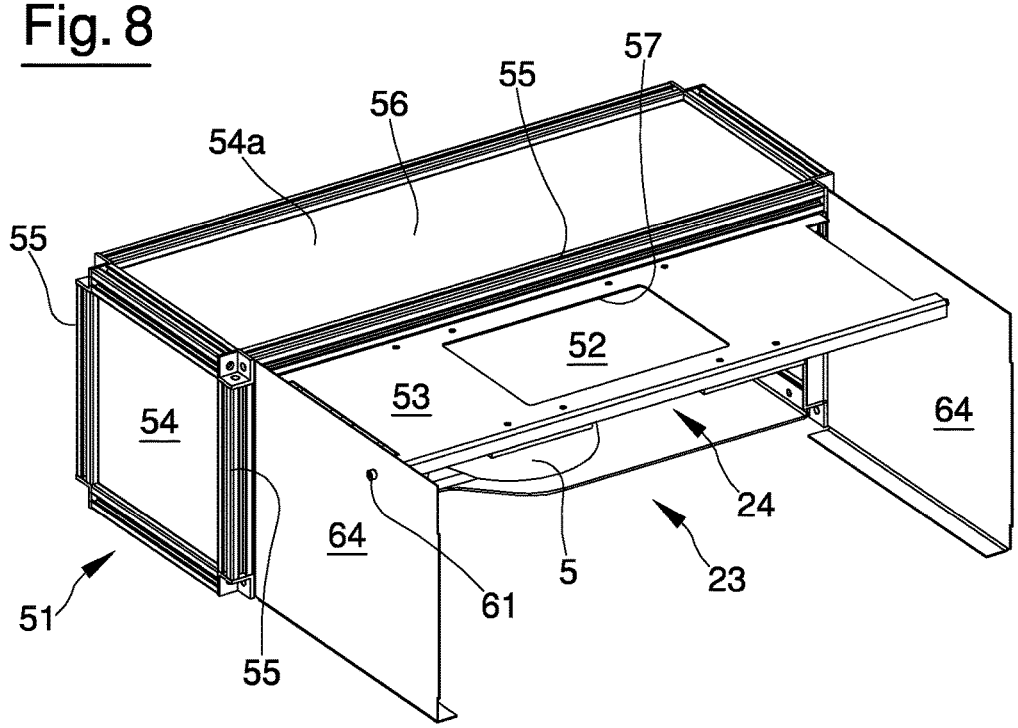
FIG. 8 is a perspective view showing a tool for positioning a scanning device according to another alternative embodiment, and the corresponding scanning device.
Figure 9:
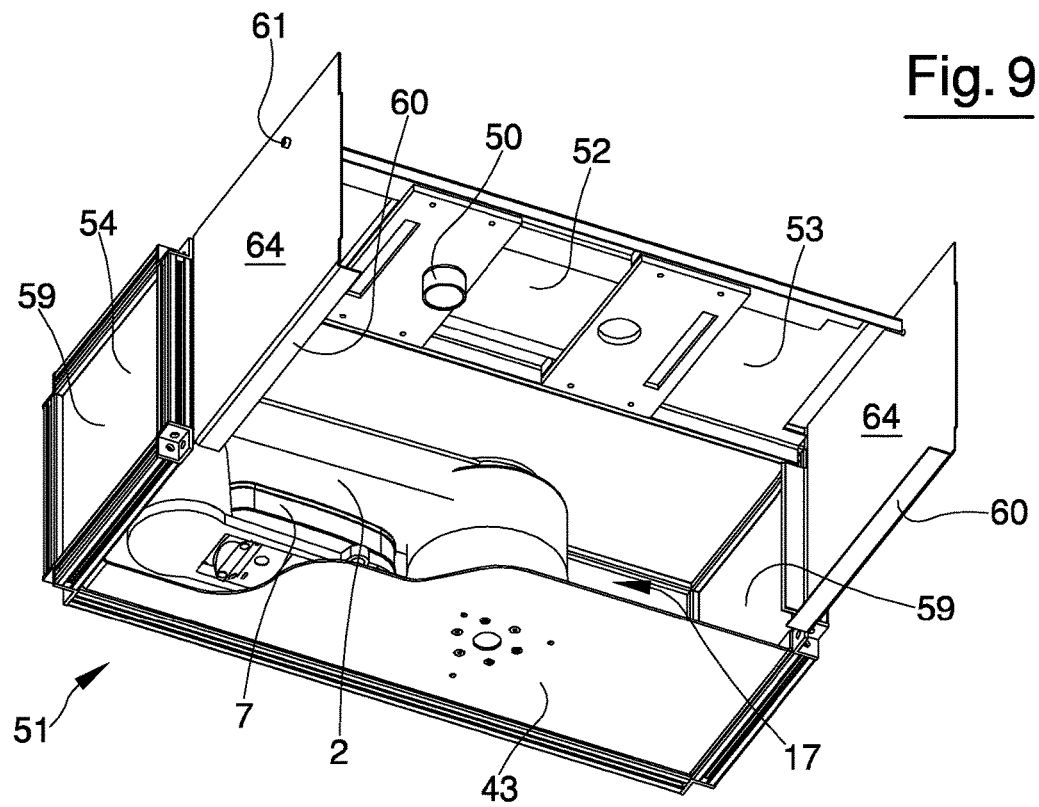
FIG. 9 is a bottom perspective view of the tool of FIG. 8 and of the corresponding scanning device.

FIGS. 8 and 9 show a tool 51 for positioning a scanning device 2, according to a further alternative embodiment.

The parts of the tool 51 common to the tools shown in FIGS. 1 to 7 are indicated with the same reference numbers already used previously, and will not be described again in detail.

The tool 51 shown in FIGS. 8 and 9 differs from tools described previously since it comprises a vision device provided with a video camera 50, which allows to read and record the image to be acquired by the scanning device 2. The vision device further comprises a control unit which is so programmed as to recognize, on the image recorded by the video camera 50, one or more pre-established points, which pre-established points allow to accurately determine the position of the image to be acquired with respect to the spectrometer 7.

This is particularly useful in the case in which the image that the spectrometer 7 has to acquire, is a calibration target having a plurality of colored zones or patches. In order that the colorimetric information deriving from the calibration target can be properly processed by a computer program intended for processing said information, the program needs to be informed about the position of the calibration target, from which the position of the respective patches can be then obtained. In known scanning tables, this is generally achieved by accurately positioning the spectrometer 7 consecutively above at least three vertices of a rectangle defining the contour of the calibration target, the position of which is stored by the scanning device 2. This may give rise to errors, especially where this procedure is performed by careless or hurried operators. Indeed it may happen that the operator is insufficiently accurate in positioning the spectrometer 7 above the vertices of the calibration target, in which case the scanning device 2 shall store a wrong position for the calibration target. If this happens, the scanning device 2 is initialized in an imprecise manner, thereby affecting the accuracy of all subsequent operations.

The vision device is intended to avoid such drawbacks.

To this end, the vision device is programmed for reading the image that the spectrometer 7 has to acquire, and for recognizing pre-established points on said image. If the image is a calibration target, said points may coincide with the vertices of a rectangle defining the perimeter of the calibration target.

The control unit of the vision device is connected to the scanning device 2 by means of a connector, comprising for example a cable provided with USB terminals. In this way the control unit of the vision device may communicate to the scanning device 2 the position of the pre-established points of the calibration target. The scanning device 2 is thus able to calculate how the calibration target is positioned.

The control unit of the vision device can be programmed also for processing other information which can be obtained from the reading of the image to be acquired, which was performed by the video camera 50. For example, in the image to be acquired, there may be provided a numerical code, in particular in the form of a digital matrix code, which can be decrypted by the control unit so that corresponding information can be transmitted to the scanning device 2. The numerical code may contain for example information on the number of patches comprised in the calibration target, the number of colours used to print the calibration target and the like. This information can be helpful to the scanning device 2 in processing the scanned image.

In the embodiment shown in FIGS. 8 and 9, the video camera 50 is integrated in a tablet 52. The control unit that controls the video camera 50 is in this case the control unit of the tablet 52, in which a suitable software is stored. The tablet 52 has the advantage of making available, in a simple and relatively inexpensive way, both a video camera and related control unit, as well as an operator interface.

In the embodiment shown in FIGS. 8 and 9, the tool 51 comprises a support having a resting wall 43 which is quite similar to the resting wall of the tool 41 shown in FIGS. 6 and 7. The tool 51 further comprises a protection structure 56 having a supporting frame obtained by means of bars 55, between which bars 55 there are defined openings which are closed by panels 54.

The tablet 52 is fixed to a support panel 53 which can be hinged to a bar 55 delimiting an upper panel 54a of the protection structure 56.

The support panel 53 is movable between a working position, shown in FIGS. 8 and 9, and an inactive position not shown. In the working position, the support panel 53 is arranged in a substantially horizontal position. The video camera of the tablet 52 is facing downwards, so as to be able to acquire the image located in the operative zone 23 of the scanning device 2. The screen of the tablet 52 is facing upwards and is positioned at a window 57 formed in the support panel 53, thus becoming accessible to an operator.

In the inactive position, the support panel 53 is substantially vertical and frontally closes the opening 24 which is defined between the protection structure 56 and the resting wall 43.

The tool 51 further comprises two closing elements 64, which in the example shown are shaped as panels hinged to respective bars 55, the bars 55 delimiting two side panels 59 of the protection structure 56.

The closing elements 64 are movable between an open position, shown in FIGS. 8 and 9, and a closed position that is not shown. In the open position, the closing elements 64 do not obstruct the opening 24, so that the spectrometer 7 is allowed to exit the housing 17. In the closed position, the closing elements 64 co-operate with the support panel 53 in order to close the opening 24.

The closing elements 64 can be provided with lower bent edges 60 which are resting on the substrate bearing the image to be scanned, when in the open position thereof. The lower bent edges 60 thus behave like the side appendages 4 of FIGS. 1 to 3 and allow to make more stable the tool 51 and the scanning device 2 supported by it.

The resting zone, in which the tool 51 is resting on the substrate carrying the image to be acquired, is thus defined by the resting wall 43 and the lower bent edges 60.

The closing elements 64 may be further provided with an anchoring element, through which the support panel 53 can be anchored to the closing elements 64 so as to be maintained horizontal in the working position. The anchoring element may comprise at least one hole for each closing element 64. Within this hole, a pin 61 is engaged in the working position, which pin 61 is fixed to the top panel 53. The closing elements 64 thus support the support panel 53 in the working position.

The tool 51 may comprise one or more lighting elements, not shown, for example in the form of LEDs, for illuminating uniformly the image to be acquired. The lighting elements may be positioned behind the side panels 59 or under the support panel 53.

The tool 51 operates in the same way as previously described with reference to FIGS. 1 to 7. In particular, it can be placed directly onto the substrate carrying the image to be acquired, since the resting zone of the tool 51 does not extend into the operative zone 23 in which the spectrometer 7 is moved for acquiring the image.

The tool 51 therefore allows to obtain all the advantages already described with reference to FIGS. 1 to 7, in particular as regards the virtually unlimited size of the substrate carrying the image to be acquired. Owing to the vision device, the tool 51 further has a series of additional functions that make it easier to process the image.

The tools that have been described and shown in FIGS. 1 to 9, may be used not only for acquiring calibration targets, but also for acquiring other types of images. In particular, such tools can be used for acquiring images one wishes to reproduce on other substrates, possibly after having properly processed them. By way of example, the tools at issue may be used for acquiring a marble image with the purposes of reproducing it on a ceramic tile. It is also possible to position the tools herein described directly onto a floor in order to acquire the image of portions of the floor, for example in a church or in an ancient building, if it is desired to reproduce the image of the floor on a different substrate.

In these cases, the image acquired by the spectrometer 7 is of low spatial resolution, but can still be used to correct chromatically images with much higher resolution, for example by means of the "colour matching" function with which some graphics programs are provided.

In the embodiments herein illustrated, the operative zone 23 in which the spectrometer 7 moves for acquiring the image, is conformed as a free zone extending in front of the resting wall, or surrounded on three sides thereof by the resting wall and the side appendages. It is further possible to provide one embodiment, in which the operative zone 23 is surrounded on all sides by parts of the tool. This is achieved, for example, by providing the tool shown in FIGS. 1 to 3, with a strip joining the free ends of the side appendages 4. Thus, a support structure is obtained which extends along the entire perimeter of the operative zone 23, while leaving uncovered the inside of this perimeter, so as to allow the spectrometer 7 to acquire the image on the substrate on which the tool rests.

The tools of FIGS. 4 to 9 may be so dimensioned that, in the closed position thereof, they are transportable in the cabin of a plane as hand luggage according to international standards.

In an embodiment that is not shown, the tool according to the invention may comprise a motorized component, such as a track, a table or the like, to which the scanning device 2 is fixed. The motorized component is movable relative to the support 8, so that, by moving the motorized component, the scanning device 2 can be moved with respect to the support 8. This allows to enlarge extension of the operative zone, in which the spectrometer 7 may perform scanning of the image.

The scanning device 2 may have a conformation different from that illustrated in the figures.

In conclusion, the above described tools allow to improve use of the scanning device 2, by adding to it many capabilities and functions, without limiting the benefits that the scanning device 2 itself is able to provide.

The invention claimed is:

1. A combination of:
   a substrate consisting of a ceramic tile, the ceramic tile having a surface on which an image to be scanned is provided; and
   an apparatus,
   wherein the apparatus comprises:
   a scanning device provided with a spectrometer, and
   a tool for positioning the scanning device on the ceramic tile,
   wherein the tool comprises:
   a support which supports the scanning device, the support having a resting zone that rests on the ceramic tile, and
   a fixing arrangement by means of which the scanning device is fixed to the support,
   wherein the spectrometer is movable in an operative zone for acquiring said image,
   wherein the support leaves uncovered the operative zone in which the spectrometer is movable, so that the spectrometer can acquire the image provided on the ceramic tile below the spectrometer while the support is resting directly on the ceramic tile,
   and wherein the tool further comprises a vision device comprising a video camera for recording said image and a control unit that controls the video camera, the video camera being distinct from the spectrometer, the control unit being programmed to recognise pre-established points of the image recorded by the video camera and to communicate position of the pre-established points to the spectrometer.

2. A combination according to claim 1, wherein the tool further comprises a protection structure connected to the support, between the protection structure and the support a housing being defined for receiving the scanning device in a rest configuration, wherein the housing has an opening suitable for allowing the spectrometer, during use, to access the operative zone for acquiring the image.

3. A combination according to claim 2, wherein the support comprises a resting wall, the tool further comprising a pair of side appendages that project from opposite end zones of the resting wall towards the operative zone, the side appendages having lower surfaces suitable for enlarging the resting zone of the support.

4. A combination according to claim 3, wherein the side appendages are fixed relative to the resting wall.

5. A combination according to claim 3, wherein the side appendages are conformed like closing elements, said closing elements being movable between a closed position for closing said opening and an open position in which the spectrometer can pass through the opening for being moved into the operative zone.

6. A combination according to claim 2, wherein the support and the protection structure are so dimensioned that, in the rest configuration, the scanning device is contained within the tool and the tool has dimensions such as to be transportable in the cabin of a plane as hand luggage.

7. A combination according to claim 1, wherein the control unit is programmed to recognise the vertices of a calibration target provided in the image and to use the position of said vertices to drive the scanning device.

8. A combination according to claim 1, wherein the control unit is programmed to decode a numerical code associated with the image and containing information on the image, so as to use said information to drive the scanning device.

9. A combination according to claim 1, wherein the video camera and the control unit of the vision device are integrated into a tablet.

10. A combination according to claim 9, wherein the tablet is supported by a support panel which, during use, can be positioned in a working position in which the support panel is horizontal so that the tablet is arranged above the operative zone, the video camera of the tablet facing downwards to record the image, a screen of the tablet facing upwards so as to be accessible by an operator through a window obtained in the support panel.

11. A combination according to claim 10, wherein the tool further comprises a protection structure connected to the support, between the protection structure and the support a housing being defined for receiving the scanning device in a rest configuration, wherein the housing has an opening suitable for allowing the spectrometer, during use, to access the operative zone for acquiring the image, the support panel being movable between said working position and an inactive position in which the support panel is vertical and closes said opening.

12. An apparatus A combination according to claim 11, wherein, in the working position, the support panel is supported by closing elements that are movable between a closed position for closing said opening and an open position in which the spectrometer can pass through the opening for being moved into the operative zone.

13. A combination according to claim 1, wherein the scanning device comprises an arm and the spectrometer is rotatably connected to the arm.

* * * * *